US 8,031,912 B2

(12) United States Patent
Dennis et al.

(10) Patent No.: US 8,031,912 B2
(45) Date of Patent: Oct. 4, 2011

(54) BIOMETRIC SENSOR APPARATUS AND METHOD

(75) Inventors: Carl Dennis, Edinburgh (GB); Khodor Fawaz, Edinburgh (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 710 days.

(21) Appl. No.: 12/114,246

(22) Filed: May 2, 2008

(65) Prior Publication Data

US 2008/0273768 A1   Nov. 6, 2008

(30) Foreign Application Priority Data

May 4, 2007  (EP) .................................... 07107574

(51) Int. Cl.
    *G06K 9/00* (2006.01)
(52) U.S. Cl. ...... 382/115; 340/5.53; 340/5.83; 713/186; 902/3
(58) Field of Classification Search .................. 382/115, 382/116–127; 340/5.1, 5.2, 5.52, 5.53, 5.8–5.86; 356/71; 713/186; 902/3
See application file for complete search history.

(56) References Cited

U.S. PATENT DOCUMENTS

| | | | | |
|---|---|---|---|---|
| 5,737,439 A | * | 4/1998 | Lapsley et al. | 382/115 |
| 5,933,502 A | * | 8/1999 | Aucsmith et al. | 713/168 |
| 6,895,104 B2 | * | 5/2005 | Wendt et al. | 382/125 |
| 7,359,553 B1 | * | 4/2008 | Wendt et al. | 382/192 |
| 7,539,331 B2 | * | 5/2009 | Wendt et al. | 382/124 |
| 7,948,361 B2 | * | 5/2011 | Bennett et al. | 340/5.82 |
| 2003/0118218 A1 | * | 6/2003 | Wendt et al. | 382/124 |
| 2005/0201597 A1 | * | 9/2005 | Wendt et al. | 382/125 |
| 2007/0014443 A1 | | 1/2007 | Russo | |
| 2007/0263906 A1 | * | 11/2007 | Fujii et al. | 382/115 |
| 2008/0273768 A1 | * | 11/2008 | Dennis et al. | 382/124 |
| 2010/0312698 A1 | * | 12/2010 | Bonalle et al. | 705/41 |

FOREIGN PATENT DOCUMENTS

| | | |
|---|---|---|
| EP | 1 353 292 A1 | 10/2003 |
| WO | PCT/US00/27782 | 4/2001 |
| WO | PCT/US01/30789 | 4/2002 |

OTHER PUBLICATIONS

Eberhard Bassenge, Nelli Fink, Mikhail Skatchkov, and Bruno Fink, Dietary Supplement with Vitamin C Prevents Nitrate Tolerance, J. Clin. Invest., The American Society for Clinical Investigation, Inc., vol. 102, No. 1, Jul. 1998, pp. 67-71.
European Search Report, EP 07 10 7574, Jul. 30, 2007, 9 pages.

* cited by examiner

*Primary Examiner* — Aaron Carter
(74) *Attorney, Agent, or Firm* — Gardere Wynne Sewell LLP

(57) ABSTRACT

A biometric sensor apparatus uses an infra red light source and a CMOS image sensor. A platen receives a body part and the image sensor receives light transmitted through the body part. A processor determines from the detected through-transmitted light whether the body part is live or is a spoof body part. This determination is based upon a detected variation of the opacity of the body part due to blood flow through the body part. Digital processing of the collected image signal data is performed, such as by smoothing. The sensor may further function as a pattern (such as a fingerprint) sensor for detecting surface patterns on the presented body part and identifying an individual from those sensed patterns.

22 Claims, 8 Drawing Sheets

US 8,031,912 B2

BIOMETRIC SENSOR APPARATUS AND METHOD

PRIORITY CLAIM

The present application claims priority from European Application for Patent No. 07107574.1 of the same title filed May 4, 2007, the disclosure of which is hereby incorporated by reference.

BACKGROUND

1. Technical Field of the Invention

The present invention relates to a biometric sensor apparatus and method. More particularly, but not exclusively, it relates to a biometric sensor apparatus and method for determining blood volume variations with respect to time in a body part. Even more particularly, the invention relates to an apparatus and method for determining blood volume variations with respect to time in a body part to identify and measure features of a user's heart beat.

2. Description of Related Art

The field of biometrics relates to the statistical analysis of physiological characteristics. For the purposes of identification for security or other purposes, features such as finger prints or retinal scans can be used to uniquely identify individuals.

A weakness of many biometric systems is that they can be fooled or "spoofed". In the case of a fingerprint reader this is done by copying or lifting a fingerprint of a legitimate individual from a surface such as a drinking glass and subsequently presenting it to a fingerprint reader to impersonate that person.

For example, every person has a unique set of fingerprints, and this provides a basis for identification. An image of a fingerprint can be taken and analyzed to see if it matches a recorded sample of the user's fingerprints. This is done by analyzing a number of details, or "minutiae" of the fingerprint. The greater the number of minutiae that are matched, the less the chance of incorrectly identifying an individual.

However, a biometric identification system that relies solely on mathematical analysis of simple optical images can be easily spoofed, as a copy of the pattern of a fingerprint can be easily made and presented to a reader device.

Systems have been developed to determine whether a sample used in a biometric identification process is from a living person i.e. a live finger, or a photocopy, synthetic model or suchlike.

European Patent application publication number 1353292A (the disclosure of which is hereby incorporated by reference) describes the use of visible and/or infra red (IR) illumination to capture an optical image of the blood vessels of a user's finger. These images show a changes in opacity of the blood vessels due to blood flow. The changes in opacity of the blood vessels of a user's finger during the cardiac cycle can be used to infer the user's liveness (i.e., that the presented finger is from a live person, rather than some inanimate copy). This enables the system to distinguish a biometric sample presented to a fingerprint reader from a living user to that from a fake finger or spoof.

Typically, heart rate monitors work on the same principal as a two lead ECG and signals are acquired using electrical detectors fitted into a chest strap. These detectors record instantaneous heart rate, maximum heart rate, average heart rate over a period and/or exercise time in a heart rate zone.

As used herein, "an optical image sensor" means a sensor that is responsive to electromagnetic radiation at least in the visible and/or infra red (IR) or near-IR regions. Hereafter, references to IR include near-IR, for example 700 to 1100 nm (nanometers).

SUMMARY

Embodiments are presented as defined in the appended claims.

In an embodiment, a biometric sensor apparatus comprises: at least one light source arranged to irradiate an object presented for biometric identification; an optical image sensor arranged to capture radiation that has passed at least part way through the object; and a data processor which processes signals output from the image sensor, the data processor calculating at least one statistical value representative of a parameter indicating a likelihood of whether the object is a body part and further determine a likelihood that the object is a body part.

In an embodiment, a method for determining whether an object presented to a biometric sensor device is a live body part, comprises: illuminating an object presented for biometric identification; detecting a variation in opacity of said object with respect to time using an image sensor; determining at least one statistical value representative of a parameter indicating the likelihood of whether the object is a body part; and analyzing variations in the statistical values to determine whether said object is a live body part.

In an embodiment, a biometric scanning device comprises: an apparatus which functions to: illuminate an object presented for biometric identification; detect a variation in opacity of said object with respect to time using an image sensor; determine at least one statistical value representative of a parameter indicating the likelihood of whether the object is a body part; and analyze variations in the statistical values to determine whether said object is a live body part. The device comprises any one, or combination, of the following: a fingerprint scanner, a retinal scanner, a palm scanner, a body part scanner adapted to scan any given body part.

In an embodiment, a biometric sensor apparatus comprises: at least one light source arranged to irradiate an object presented for biometric identification; a sensor which senses the irradiation light to detects a variation in opacity of said object with respect to time; and a processor which processes the sensed variations in opacity to determine a statistical value representative of a parameter indicative of whether the object is a living body part, and further analyze variations in the statistical value to determine whether said object is a living body part.

BRIEF DESCRIPTION OF THE DRAWINGS

Embodiments of the present invention will now be described, by way of example only, with reference to the accompanying drawings, in which.

DETAILED DESCRIPTION OF THE DRAWINGS

Embodiments will be described in relation to systems for biometric identification based on fingerprints, but such embodiment are also applicable to identification based on unique characteristics of other body members, particularly hand or palm prints.

Figure 1:
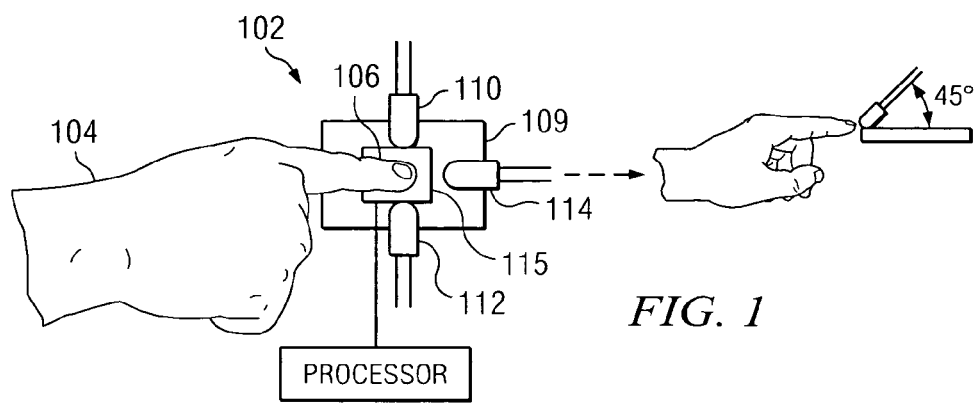
FIG. 1 is schematic diagram of an embodiment of a biometric sensor apparatus and a hand.

Reference is made to FIG. 1 which shows a biometric sensor apparatus 102 and a hand 104. The biometric sensor apparatus 102 is adapted to read and analyze a fingerprint of a fingertip 106 placed in contact with a platen 109. Typically the platen 109 is transparent in the range 350-1100 nm.

The sensor apparatus 102 comprises three illumination sources 110, 112, 114 suitably light emitting diodes (LEDs) and a sensor array 115. The LEDs 110, 112, 114 are on the opposite side of the platen 109 and the sensor array 115. The platen 109 is either translucent, or transparent to the wavelengths emitted by the LEDs 110, 112, 114. In the present embodiment the sensor array 115 is mounted underneath the platen 109 to image the fingertip 106, and the LEDs 110, 112, 114 are mounted above the platen 109, in close proximity to the fingertip 106.

Typically the LEDs 110, 112, 114 emit at wavelengths in the range 350-1100 mm. Longer wavelengths can be used with specialized sensor arrays. Normally, the wavelengths at which the LEDs 110, 112, 114 emit radiation are non-overlapping although it will be appreciated that the use of overlapping wavelengths is possible provided that the signal from each of the LEDs 110, 112, 114 can be resolved. The first and second LEDs 110, 112 are arranged perpendicular to a fingertip receiving portion of the platen, facing toward the fingertip receiving portion. The third LED 114 faces at an angle of incidence of approximately 45° toward the fingertip receiving portion.

The LEDs 110, 112, 114 can have a rapid duty cycle, typically of the order of a few microseconds, and their intensity may be controlled. The biometric sensor 102 can select an LED 110, 112, 114 having a particular wavelength or adjust the operating conditions before or during the liveness detection process in order to confirm that the apparatus is operating as expected and has not been tampered with. This control could be adjusted in a pseudo-random manner determined by the fingerprint reader so that the conditions can not be anticipated externally.

Typically, the sensor array 115 is a CMOS optical sensor, usually comprising a two dimensional array of sensor elements. The sensor array 115 may be a two dimensional photo diode imager. Alternatively, the image sensor may also be a one dimension photo diode array, such as that used in a swipe style fingerprint sensor. The sensor array is connected to the data processing means which receives and processes signals output from the sensor. The data processor processes the signals output from the image sensor and calculates at least one statistical value representative of a parameter indicating a likelihood of whether the object is a body part. The data processing means further determines a likelihood that the object is a body part. In this way, the data processing means analyzes the output of the image sensor for characteristics of spoofing. This is accomplished by having the data processing means, for example, calculate at least one statistical value representative of a parameter indicative of blood flow through a body member. As will be discussed in more detail below, the data processing means identifies any one, or combination, of the following within the output of the image sensor: systolic notch, dicrotic notch, incisura, peak. When a visible light source is available, the data processing means derives an optical pattern associated with the object from the output of the optical sensor in the visible region. This optical pattern may, for example, be a fingerprint.

A typical two dimensional array 115 may comprise in the region of 50,000 to 500,000 pixels and a sample of, for example 64 pixels may be used in liveness analysis. It is even possible to collect data from one pixel for each frame. This single pixel may be used as the average data value since the images are typically raw images. By accessing only a portion of the array a high sampling rate can be achieved.

In a preferred embodiment, the sensor array 115 may be a monochromatic sensor array, although a color sensor array can be used. An optical stack comprising a lens or other optical components may be interposed between the sensor array 115 and the platen 109.

In use, the LEDs 110, 112, 114 are used in combination with the sensor array 115 for the detection of liveness of a finger, or other digit placed upon the platen 109.

In use, the fingertip 108 is placed upon the platen 109 and irradiated by the LEDs 110, 112, 114.

The IR radiation passing through the fingertip 108 varies with time according to the volume of blood in the fingertip 108 as will be appreciated by one skilled in the art of pulse oximetry. Accordingly, for a live fingertip 108 the signal received at the sensor array 115 will vary with time. This variation of light received at the sensor array 115 has a number of particular characteristic features associated with liveness that are difficult to spoof. These features will be described in detail hereinafter.

For the purpose of live finger detection, it is desirable to capture a number of images over a period of time determined by typical human heart rate, so as to obtain sufficient data to verify the existence of a genuine human pulse waveform.

The number of liveness images used to generate the liveness signal is based on the sensor frame rate (frames per second) and generally corresponds to at least two seconds worth of data. For example, for a sensor running at 30 fps (Frames Per Second), sixty frames or liveness images are captured. Alternatively, the liveness images can be captured on a continuous basis until the user's finger is removed.

In the preferred embodiment, the liveness signal is analyzed to make sure that the waveform corresponds to a typical sinus waveform indicative of a human heart beat. Then the period of the heart beat is measured, to see if it falls into a predetermined range of typical human heart beats. To accomplish this, the data must be sampled at an adequate rate, preferably of the order of five to ten times the Nyquist frequency for the highest frequency component of a typical heart beat. Therefore, the sensor might be required to process hundreds or thousands of liveness images per second.

It will be appreciated that in an alternative embodiment, a visible LED and sensor array may be used in conjunction with the IR arrangement in order to obtain high quality image of a fingerprint, or other visible characteristic of a person. The liveness and anti-spoofing detection described can be used in a fingerprint system.

In such an embodiment where an IR LED is used this must be positioned so that the object is illuminated in a transmission geometry. A visible LED can be positioned at an angle with respect to the object-sensor geometry. This is because live flesh, for example a finger, acts as a light pipe and the change in refractive index at the object-platen interface creates total internal reflection. This improves contrast between the features (minutae) in the image significantly. Thus, a combination of visible and IR LEDs provide the greatest flexibility.

In a fingerprint system a user's details can be entered by repeated analysis or prolonged sample extraction, enrollment of the user into the system. This enables the fingerprint system to store distinctive characteristics of the user's liveness signal. These characteristics can be used to establish a baseline to personalize liveness thresholds for each user. The thresholds may also be designed to apply to the whole group of users or general thresholds may be used based on characteristics of the liveness signal for a population.

In this embodiment it is desirable to monitor the integrity of the fingerprint system itself. Before activation of the fingerprint system, illumination signals are controlled by the liveness sensor. On a routine basis, the system activates the illumination while varying the drive signal timing and/or drive strength and captures images of pseudo random strobing or repetitive strobing of the LEDs. It is possible to determine if the system's optical path as been adjusted or interfered with.

During acquisition, in the event of a low or marginal liveness score or suspected spoofing, the intensity of illumination can be adjusted to detect corresponding changes in the liveness images. If a spoofing attempt is being made, the spoof is unlikely to respond appropriately to such changes. In addition, the fingerprint system can again prolong acquisition or repeat measurements to detect a spoofing attempt.

Objects appear different depending on the wavelength of the illumination source. Human skin has a distinct signature and the presence of a latex spoof or thin film covering the fingertip is detectable by capturing images in multiple illumination wavelengths. To detect the presence of such spoofs, the live finger illumination, a different IR wavelength and visible illumination can be used.

The LEDs 110, 112, 114 illuminate the object, in the present example the fingertip 106, at various wavelengths. The appearance of an object's captured image varies in accordance with the wavelength of the LED 110, 112, 114 illuminating the object and the response characteristic of the sensor array 115. In the present embodiment, the array 115 has a sensitivity that is sufficiently broad that the appearance of each object has a set of distinct characteristics. For example, a human fingertip is opaque at visible wavelengths but transparent at certain IR wavelengths. This is not the case for plasticene or other spoofing materials.

It will be appreciated that other combinations of illumination can also be used to detect such spoofs. Liveness images may be captured with IR or near-IR illumination and alternate liveness signal analysis schemes can be employed.

The system includes a processor or other suitable controller circuitry or logic to control operation of the system and process information obtained from the various included sensors in making liveness and identification determinations with respect to the body part which is presented for biometric identification.

Figure 2:
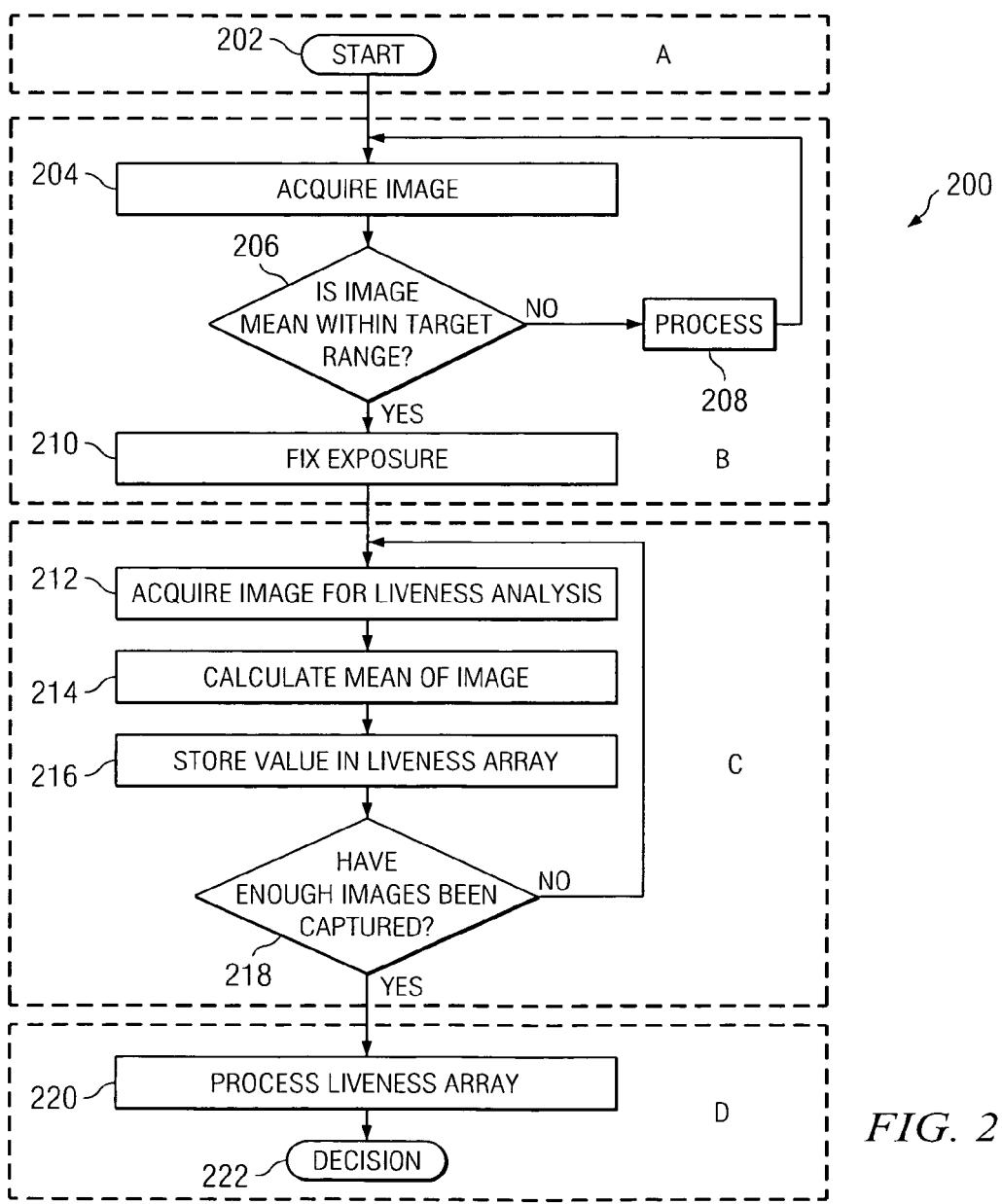
FIG. 2 is a flow chart detailing a method of liveness detection process.

FIG. 2 shows a flow chart illustrating a liveness detection process 200 (which process is executed, for example, by the processor/controller described above). The process 200 comprises four distinct phases; initiation (A), exposure and gain adjustment (B), image capture and signal extraction (C) and liveness signal analysis (D)

Stage A—Initiation

The liveness detection process may be initiated (Step 202) automatically when the optical sensor array 115 detects the presence of a fingertip 108.

In an alternative embodiment a pressure sensor may be used to initiate the process, for example a switch connected to the platen 109.

The process may be initiated manually when the user presses a start button or on a periodic basis without the user's intervention.

Stage B—Exposure and Gain Adjustment

Suitable imaging conditions are established in order to acquire the optical image (Step 204) of the fingertip 108, or liveness image, on the sensor array 115.

This involves varying the exposure and gain of the optical sensor array 115 adjusted until the mean value of the liveness image is within a suitable range (Step 206). If the mean liveness value is not within a suitable range further processing is carried out for the acquisition of the image (Step 208).

A digitized monochrome or grey scale image contains a range of "values" or codes—an 8-bit image has 256 grey level from entirely black to entirely white. A completely black or white image has little or no information content; similarly any uniform image with all pixels represented by a limited range of values. The sensor conditions for the ideal image are optimized to give the highest range of values and then when the sensor conditions are set, variations in the subject are still apparent in the image. The ideal image has values in the mid-code range—again, in an 8-bit system, around 128 codes. In the case of a live finger the image has low information content and the target value can in the range from 100 to 200 codes without risk of degradation due to saturation. For example, in the example of FIG. 4 the image mean varied from about 108.6 to 111.6 codes but it is only possible to uses this information because a number of images have been analyzed over time.

Should the mean liveness value lie within a suitable range the exposure is fixed (Step 210).

Alternatively, the exposure and gain can be based on previous imaging conditions, imaging conditions for a particular analysis cycle or standard imaging conditions.

Stage C—Image Capture and Signal Extraction

Optical images of a finger, called liveness images are acquired (Step 212). If the liveness image comprises a plurality of pixels, a statistical value of the overall intensity of each liveness image is evaluated to form a point of a liveness signal (Step 214). If the liveness image comprises a single pixel, each pixel intensity value is a point of the liveness signal.

Figure 4:
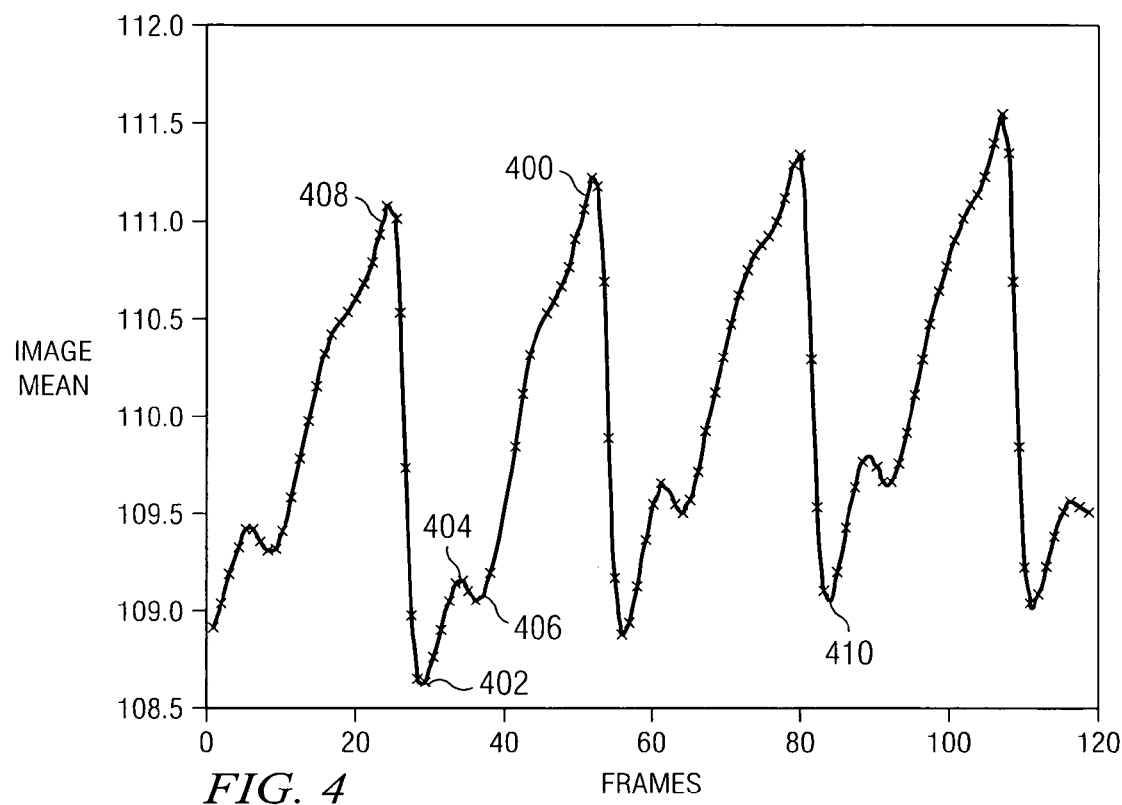
FIG. 4 is a liveness signal obtained using the method of FIG. 2 with points of interest marked.

The statistical value of the liveness image is calculated and stored in a data array (Step 216). Each value is a discrete point of a liveness signal. FIG. 4 shows a graph of the liveness signal. The individual image values are plotted with an "X".

The liveness signal may constitute other statistical values of the liveness images, such as median or mode. Alternatively, it will be appreciated that a liveness signal can comprise statistical values of a sub-sample of each image. For example, the sub-sample may be isolated using an edge detection function. The border of the finger can be detected and the image cropped to isolate a sub-sample of the image with liveness information. The liveness image may even comprise a single pixel with the resultant liveness signal comprising the intensity values of each pixel.

Stage D—Liveness Signal Analysis

The liveness signal analysis involves locating the critical points of the liveness signal (Step 220) and determining liveness characteristics from these critical points and a yes/no or pass/fail decision can be made (Step 222).

Figure 3B:
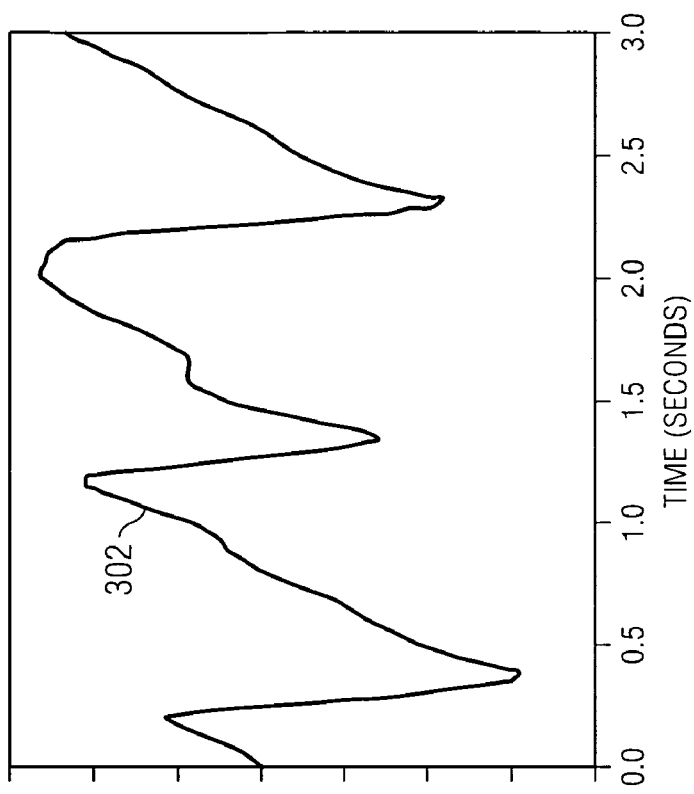
FIGS. 3a and 3b are graphs of a raw and a low pass filtered liveness signal respectively, obtained using the method of FIG. 2.
Figure 3A:
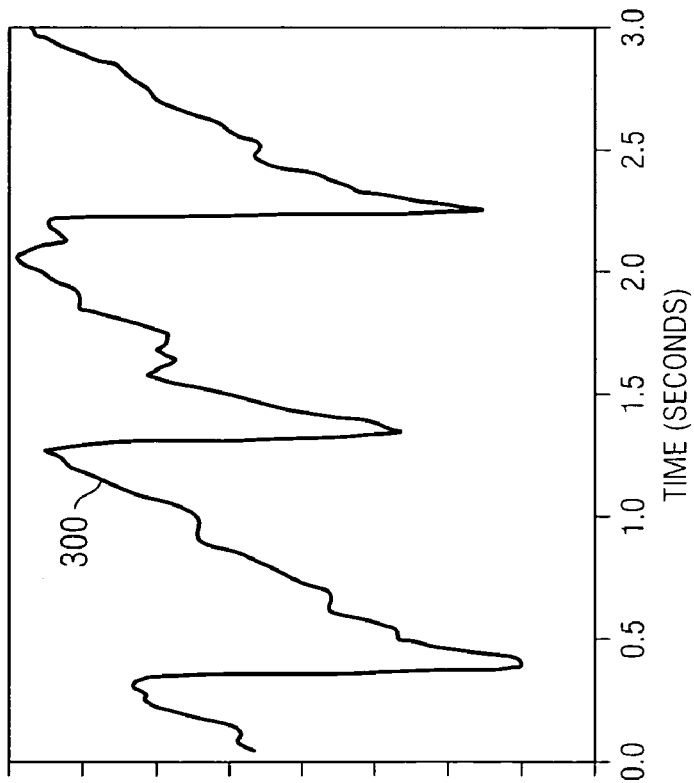

It will be appreciated that there are many different methods of conducting the liveness signal analysis and one possible method is described in detail below:

Referring now to FIGS. 3a and 3b, a raw liveness signal 300 that exhibits features related to a cardiac cycle is filtered to give a smoothed liveness signal 302. Low pass filtering techniques, for example neighborhood averaging will be known to one skilled in the art. This smoothing of the liveness signal 302 makes the critical points clearer.

In addition, the analysis of the smoothed liveness signal 302 is less likely to falsely identify noise peaks as critical points.

Figure 5:
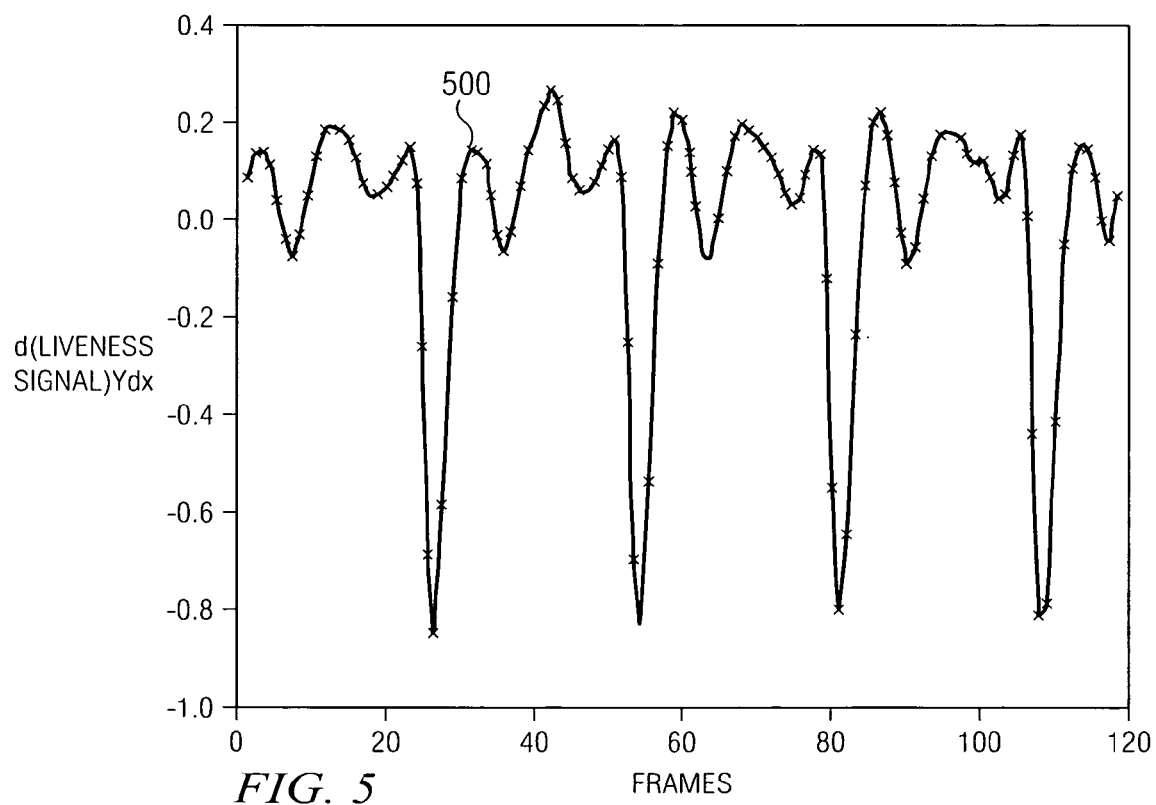
FIG. 5 is a derivative of the signal of FIG. 4.
Figure 6:
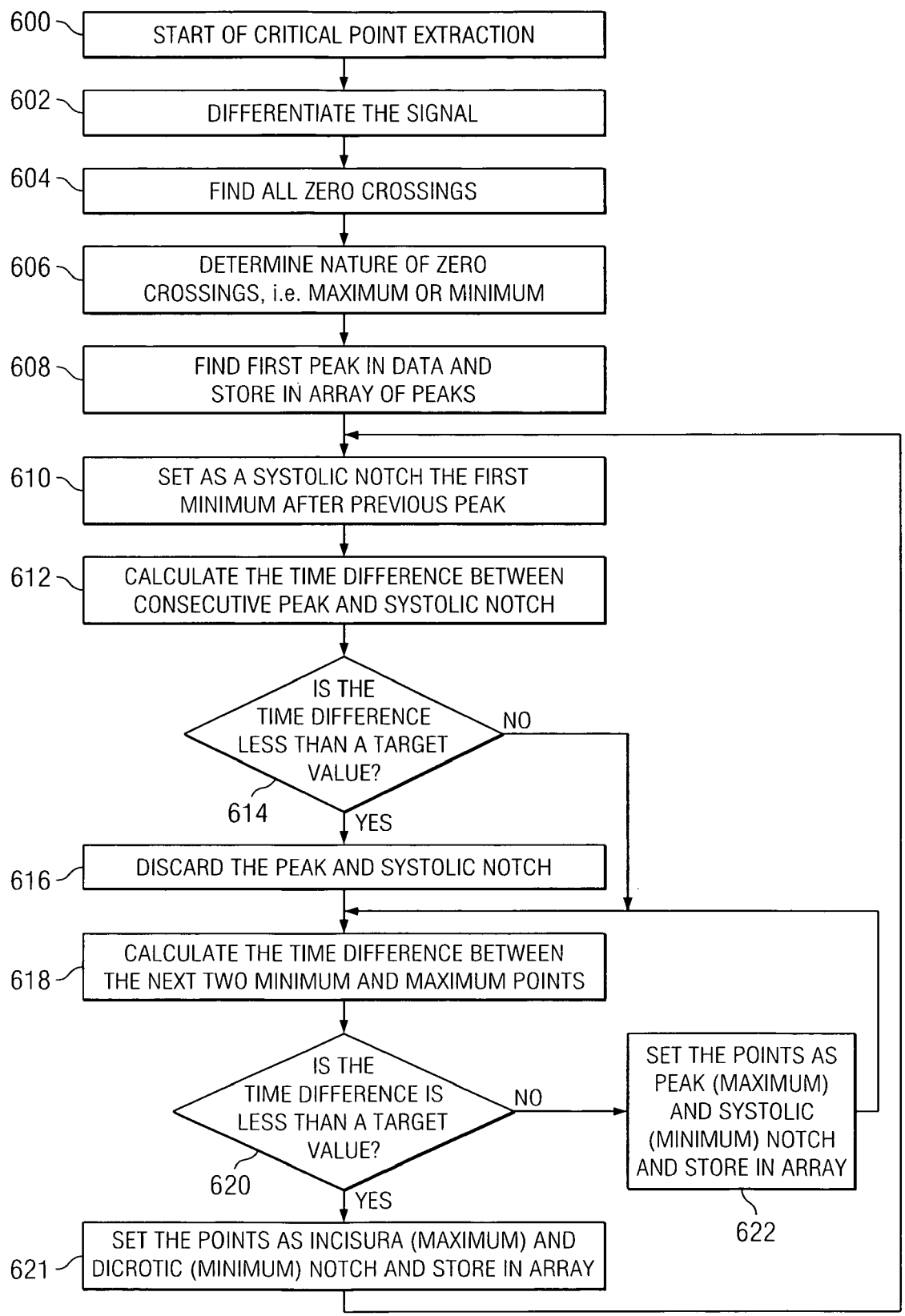
FIG. 6 is a flow chart of a liveness signal analysis during the liveness detection process of FIG. 2.

Referring now to FIGS. 4 to 6, a liveness signal 400 taken from the blood flow through from a live digit comprises a number of critical liveness points, including systolic notches 402, incisura 404, dicrotic notches 406, maxima 408 and minima 410.

Liveness parameters can be extracted from this raw liveness data, for example: Heart Rate (b.p.m.)=60/(P1P2), where P1P2 is the time in seconds elapsed between the first and second peak; Period Range=a; Magnitude of the ration of dicrotic to systolic notches=b/a, where a is the difference in magnitude between the largest image mean (first peak P1) and the smallest image mean (systolic notch S), and b is the difference in magnitude between the largest image mean (first peak P1) and the dicrotic notch D; $\Delta t(SD)$=Magnitude of incisura I−Magnitude of systolic notch.

The liveness features described above can be measured and compared with threshold values based on a model liveness signal from a known subject. Thresholds may be determined from prior clinical analysis or baseline data from a sample population, a larger population or from the user. The liveness features may additionally or alternatively be compared with a variety of model liveness signals from various age, sex, health, fitness subjects and matched with the closest model to profile various characteristics of the user. It may also be possible to enter user details, such as age, sex etc, and determine the deviation from expected values. It may also be possible to derive a number of indicators of the user's health and fitness from these comparisons.

The variations in the liveness signal are related to the user's heart beat. It is possible to correlate the liveness signal with ECG and other such medical diagnostic techniques.

For example, the time delay between systolic and dicrotic notches is related to the user's age. By examining variations from a threshold value based on the user's age it may be possible to determine condition of the user's heart. The time delay between critical points and the corresponding ratios may be compared with pre-defined thresholds to determine the user's heart functionality.

A derivative 500 of the liveness signal 400. This derivative is generated in a manner known to those skilled in the art.

The analysis of a liveness signal 400 comprises an initial extraction of critical points (Step 600). The liveness signal 400 is differentiated (Step 602). The zero-crossings of the derivative are found (Step 604) and their nature, i.e. maximum or minimum, is determined (Step 606), for example by linear interpolation. The location of the first peak in the liveness signal 400 is determined (Step 608). For example by evaluation of the ratio R:

$R(\%) = (x1/r) * 100$ where r=Range of the derivative signal; and
x1=Magnitude of local minimum of the derivative signal nearest to zero crossing.

If R is greater than a threshold, in this case 50%, then the local maximum is deemed a peak. In the part of the liveness signal shown, the first peak is the second zero crossing. The threshold value for this ratio can be obtained by observing liveness signals from multiple subjects. This threshold value was not susceptible to change from one individual to another.

The first minimum following the first peak is assigned as a systolic notch 402 (Step 610). The time period between the peak and the systolic notch 402 is calculated (Step 612). A determination is made whether the determined time period is less than a threshold value (Step 614). If it is less than the threshold value the peak, systolic notch pair is discarded (Step 616) as it is deemed a result of noise in the signal. Pre-programmed threshold values obtained by analysis of the characteristics of multiple liveness signals can be used to determine critical points.

The time period between the next pair of minimum and maximum points is then calculated (Step 618). A determination is made whether the determined time period is less than a threshold value (Step 620). If it is less than the threshold value the pair are set as a peak and a systolic notch and the values are stored in a data array (Step 621). If it is greater than the threshold value the pair are set as an incisura 404 and a dicrotic notch 406 and the values are stored in a data array (Step 622). The analysis then reverts to assigning the first minimum following the next peak as a systolic notch 402 (Step 624)

It is notable that for a particular liveness signal, the incisura could be present in one period of the signal and absent in another period of the same signal.

Figure 7:
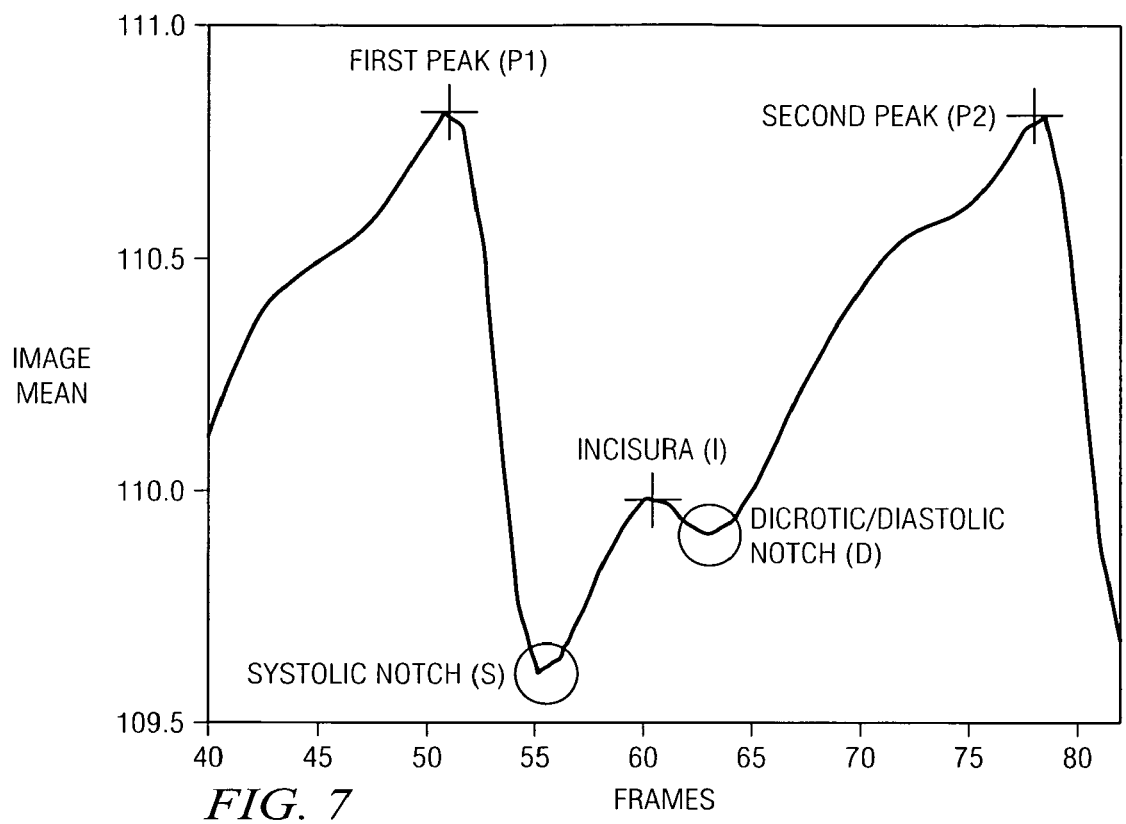
FIG. 7 is a graph of a liveness signal showing four critical points obtained using the method of FIG. 2.

FIG. 7 shows a liveness signal which has five critical points in the period shown; a first peak P1, a systolic notch S, an incisura I, and a dicrotic notch D and a second peak P2.

Figure 8:
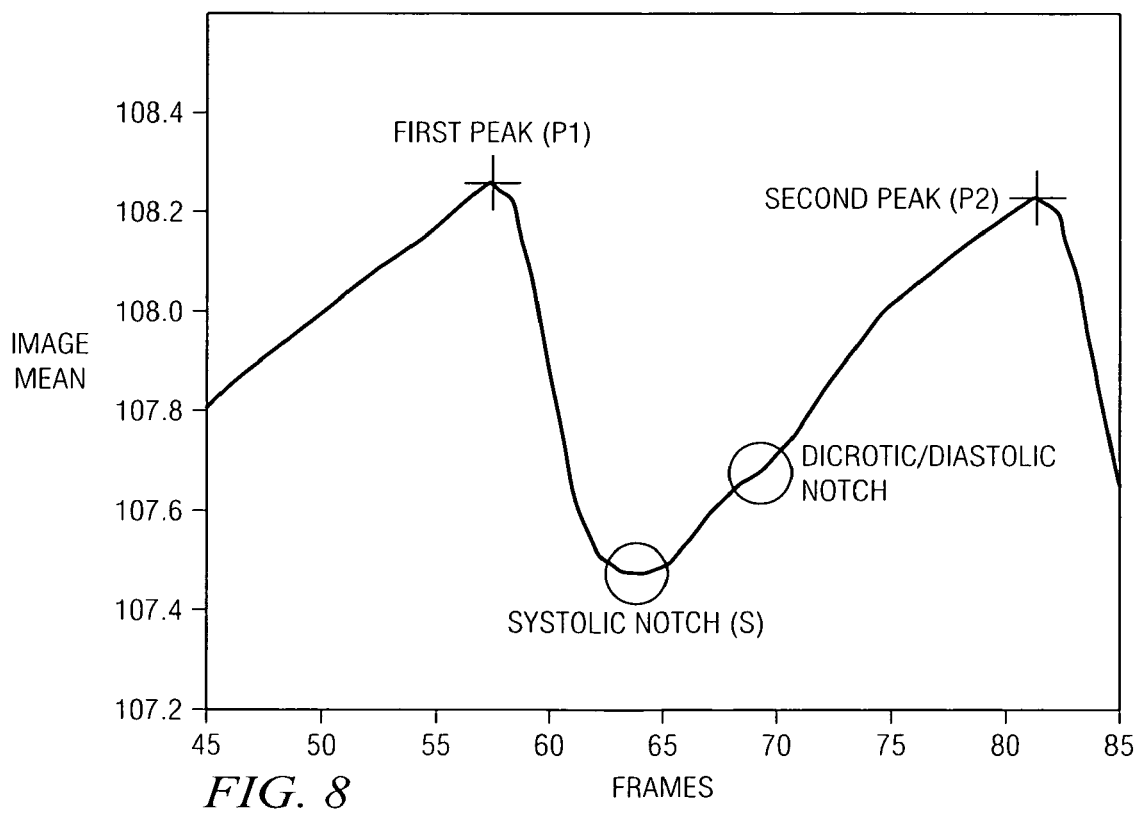
FIG. 8 is a graph of a liveness signal having three critical points obtained using the method of FIG. 2.

FIG. 8 shows a liveness signal which has four critical points in the period shown; a first peak P1, a systolic notch S, and a dicrotic notch D, and a second peak P2. There is no incisura in the period, therefore the dicrotic notch D is defined as the first derivative of the liveness signal closest to zero—a point of inflection The second part of the liveness signal analysis is to compare liveness and anti-spoofing features to thresholds. The liveness signal may be given points or a rating based on these features and their importance. For example, the total sum of points can be used to determine whether a sample is live or not.

The decision as to whether a live digit or other body part has been placed on the apparatus 100 can be based on analysis of both liveness and anti-spoofing features. Typically a liveness score is evaluated using a combination of these liveness points. Alternatively, the anti spoofing features can be excluded from the liveness score and used to automatically indicate a non-living sample.

Liveness features from the liveness signal can be calculated from the critical points and compared with predetermined thresholds. Some thresholds are determined using live finger data from a sample population but may be determined from data acquired from a larger population or a group of users of the fingerprint system.

Typical liveness indicators include frequency of the liveness signal, time delay between systolic and dicrotic notches ($\Delta t$), time delay between the critical points, slopes of lines defined by the critical points, ratio of distance between the critical points The signal obtained using IR illumination of the fingertip is related to blood volume changes in the finger. Therefore, the frequency of the maxima of the liveness signal is directly related to the heart pulse rate which is usually between 40 and 220 b.p.m.

The time delay between systolic and dicrotic notches (Δt) is affected by the user's age. The threshold value for this parameter can be fixed, for example between approximately 0.1 to 0.3 seconds, or variable based on the user's age.

The time delay between the critical points such as systolic-incisura, systolic-dicrotic, systolic-peak (rising edge) and peak-systolic (falling edge) and the ratios of these time delays are evaluated and compared with pre-defined thresholds to determine liveness. For example, the ratio of the rising to falling time delays varies between approximately 0.2 and 0.4 for a sample population. A threshold range may be derived from this data.

The slopes of the following lines: systolic-incisura, systolic-dicrotic, systolic-peak (rising edge), and peak-systolic (falling edge) and ratios of these slopes are evaluated and compared with pre-defined thresholds to determine liveness.

The ratio of the distance between the peak and dicrotic notch to the distance between the peak and systolic notch is evaluated and compared with a threshold. Generally, this parameter does not change with age, therefore, a fixed threshold value or range of values is used for comparison.

The results of all threshold comparisons or a subset of these results can be used to determine an overall score or measure of performance. This will be indicative of the closeness of correlation of the measured liveness signal with a model or known liveness signal. The model liveness signal is based on threshold and limit values corresponding to expected values or ranges of values of the liveness signal for a living sample. If the overall score or measure of performance is within a pre-determined range the sample is determined to be from a living sample. Otherwise the sample is determined to be a spoof or an attempt to deceive the liveness detection process.

Many features determined from critical points of the liveness signal can also be used for the purpose of identifying spoofing attempts. Additionally, properties of the heart beat can be used in the analysis of the liveness signal to help eliminate automated or mechanical spoofs. The fingerprint system can also be used to monitor the system's baseline condition prior to a capturing a live finger sample.

Typical anti-spoofing features include the range of recorded liveness signal, the absence of horizontal regions of the liveness signal, the presence of identical cycles within the liveness signal and the presence of discontinuities or an uncharacteristic signal within the liveness signal.

When the imaging conditions are selected the range of the liveness signal varies typically between one and five codes (8-bit data). The calculation of the range of the signal and comparison to a pre-determined threshold range prevents spoofing by shining light or moving objects over the fingerprint system at the rate of a heart beat.

The liveness signal should be continuously changing so three or more consecutive points of a similar magnitude are indicative of a spoofing attempt. In order to determine whether there is a spoofing attempt a test for this occurrence can be done. If the change in magnitude between the points is within a range, the signal may be deemed a spoof.

Measurements on a small sample population demonstrated that captured liveness signals are not identical from cycle to cycle. Different periods of the liveness signal can be compared to determine whether they are identical or closely related. Again suitable thresholds may be used to identify such identical or closely related periods and detect spoofing attempts.

Sudden changes or discontinuities in the liveness signal are indicative of an attempt to spoof the liveness detection process. The measured liveness signal can be analyzed to detect such discontinuities or compared with a model or known liveness signal to isolate an unusual feature.

Figure 9:
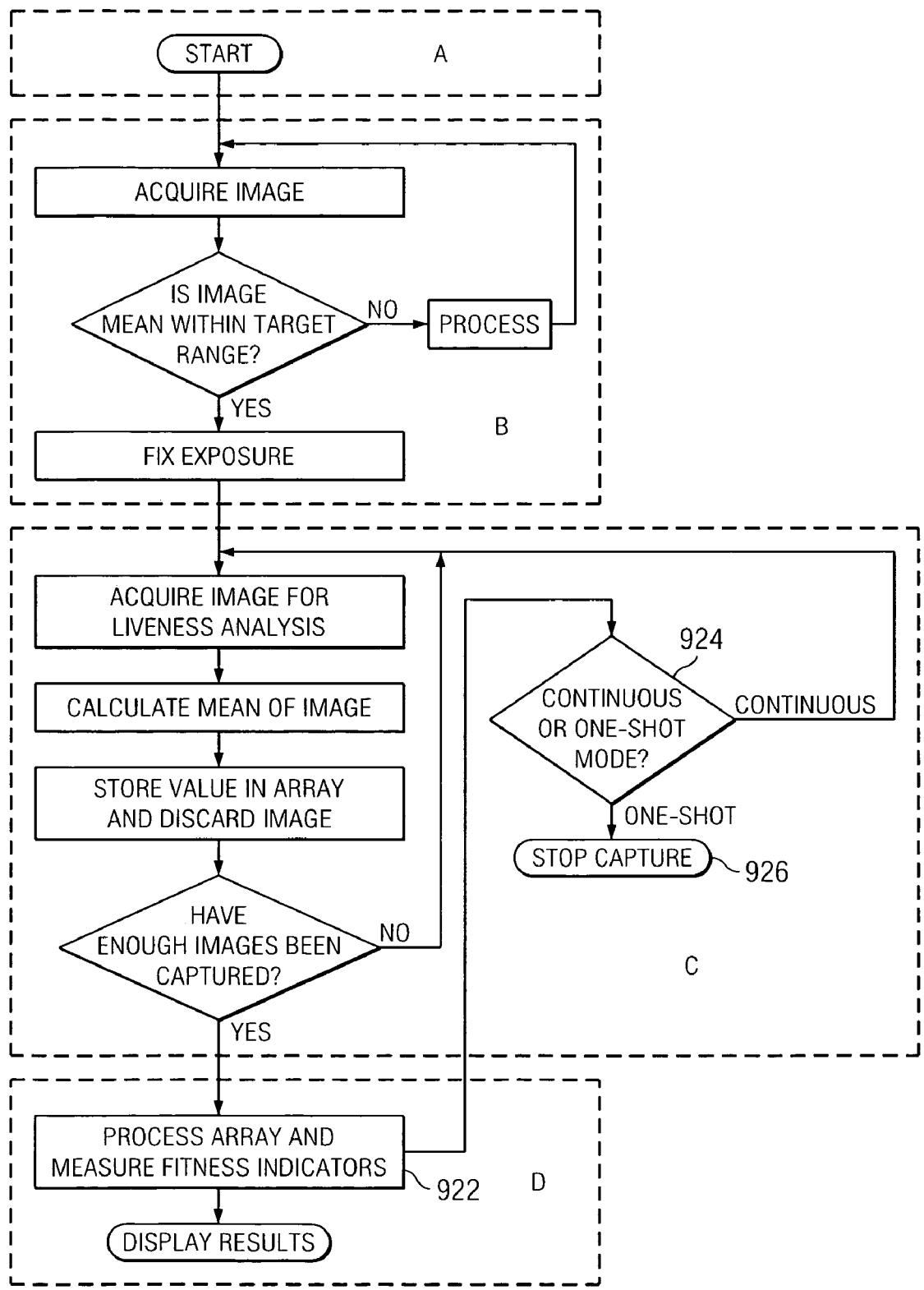
FIG. 9 is a block diagram of a liveness detection process.
Figure 10A:
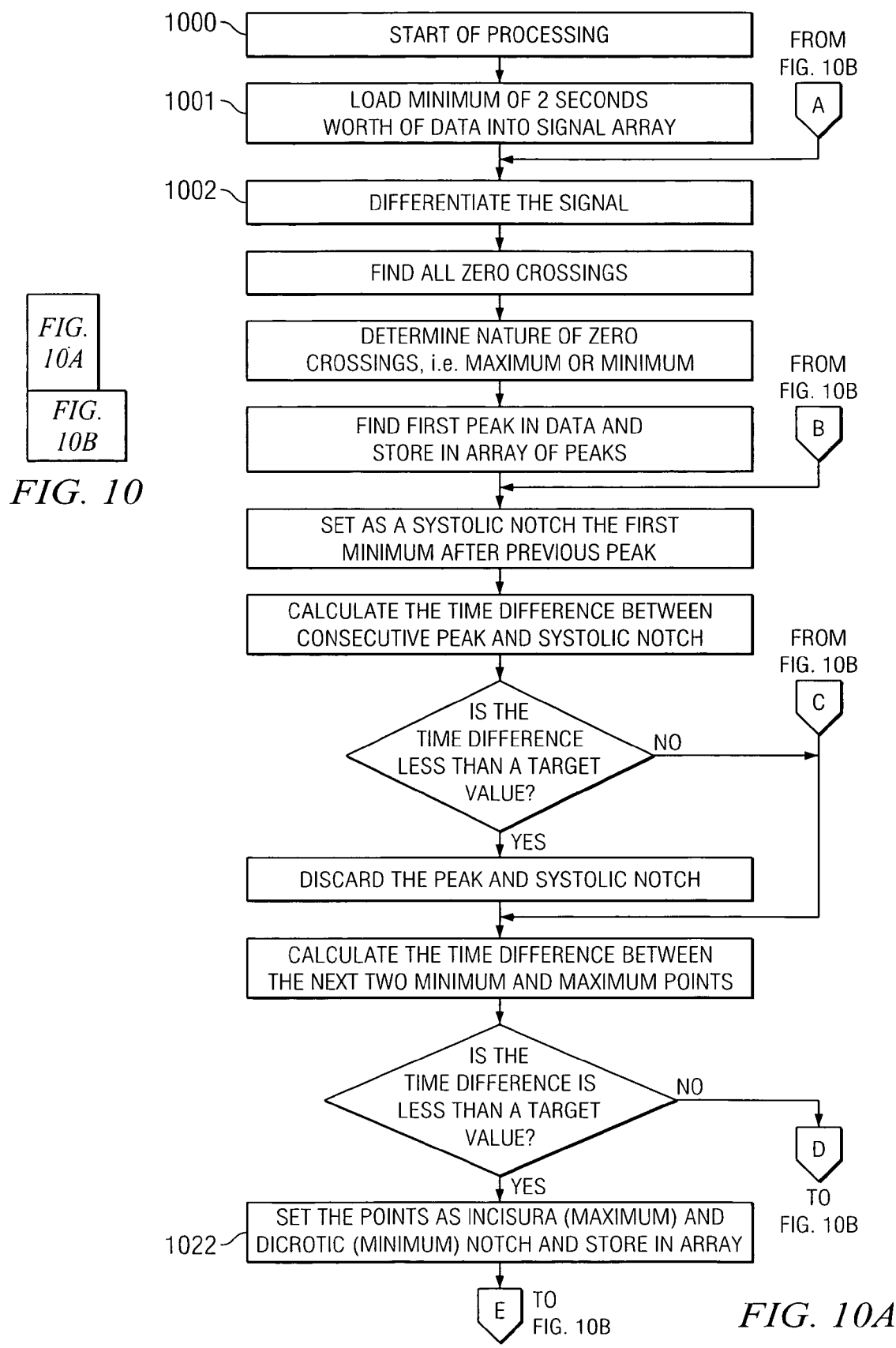
FIG. 10 is a flow chart of a liveness signal analysis during the liveness detection process of FIG. 4.
Figure 10B:
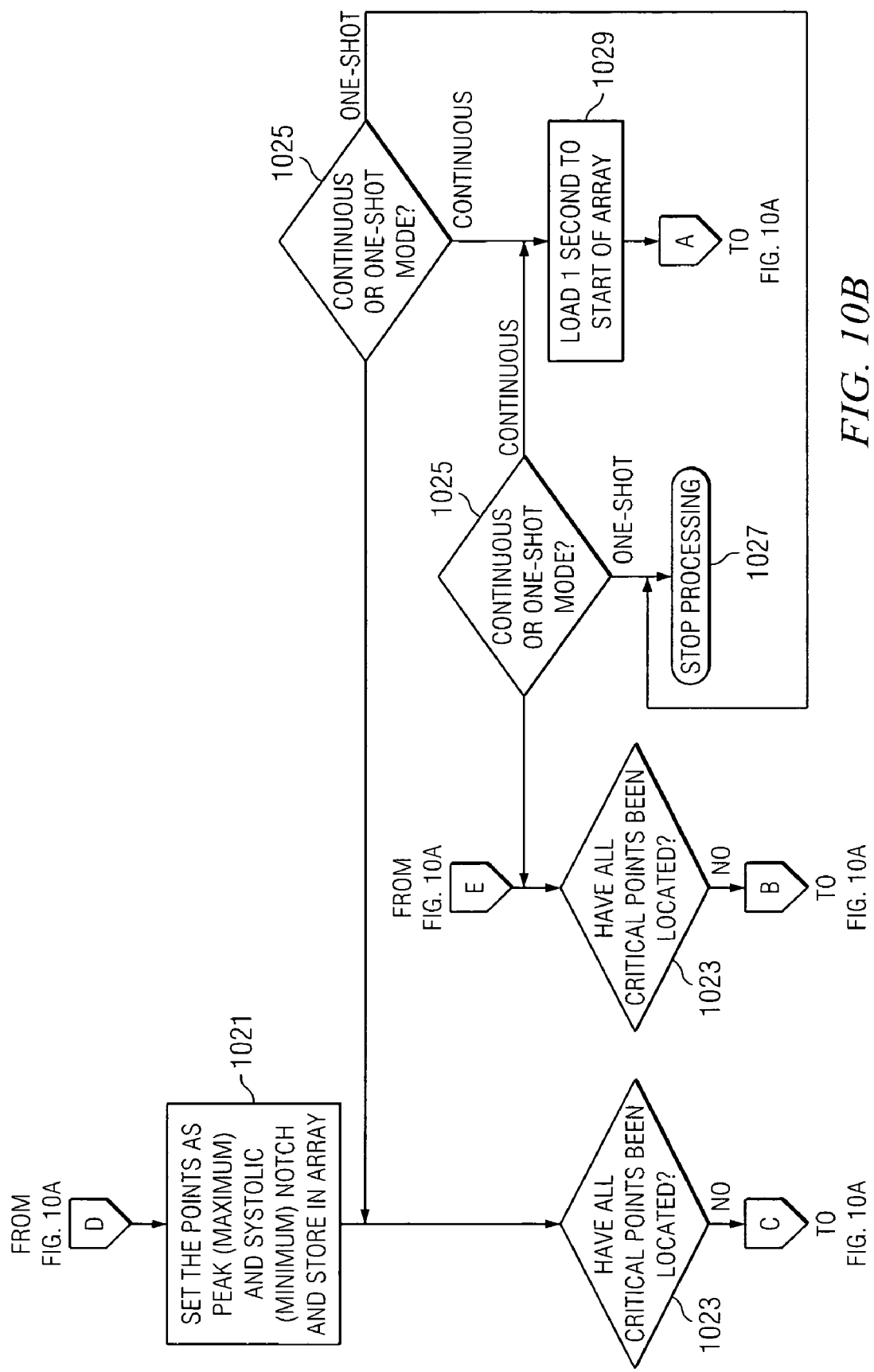

Referring now to FIGS. 9 and 10, a liveness detection process 900 that analyses features of a user's heart function. Typically, such a process is carried out during a fitness assessment. For example the process can be integrated as a function of an exercise machine, such as a static bike, running machine, cross trainer, stair climber etc. It may also be used in a fitness assessment apparatus to provide information relating to a user's heart function.

The fitness assessment may involve taking measurements of the user's heart function at various stages of training or over a longer period of time and comparing the results at these different times. In addition, the user's measurements may be compared to more general threshold values for a larger population.

The user can be enrolled or registered by measuring and analyzing their liveness signal before exercise or stressful activity is undertaken. This liveness signal establishes a baseline and individual score results and thresholds can be modeled on this liveness signal. Alternatively, the liveness detection process may use a predetermined baseline based on trials with healthy subjects of different age, weight, sex, fitness etc.

The liveness detection process may be a finite cycle of image capture and analysis or a continuous cycle of image capture and analysis until the user's finger is removed.

Referring now to FIG. 9 in particular, the process is substantially the same as that described in relation to FIG. 2, and therefore similar steps will be accorded the same reference letters and numerals in the nine hundred series.

Stages A to B are as described with reference to FIG. 2.

Stages C and D—Image capture and signal extraction and liveness signal analysis.

A determination is made, following processing of the liveness indicators (Step 922), of whether the apparatus is being used in single shot mode (time limited or limited to a number of cardiac cycles) or in a continuous mode (Step 924). If the apparatus is being used in single shot mode image capture is stopped (Step 926). If the apparatus is being used in continuous mode acquisition of images for analysis continues (Step 912).

It will be appreciated that a second embodiment is envisioned for sports practitioners or sports physiology to augment the information provided by electrical detectors. Using the process further information regarding other aspects of the heart's performance above that gained from electrical detectors can be determined.

Referring now in particular to FIG. 10, the process is substantially the same as that described in relation to FIG. 6, and therefore similar steps will be accorded the same reference letters and numerals in the one thousand series.

Following the initialization of the processing of the data (Step 1000) data acquired over a period of time, for example 2 seconds, is loaded into a signal array (1001).

Following the setting of the data points as incisura and dicrotic notches (Step 1022), a determination is made as to whether all critical points have been located (Step 1023). If they have a determination is made whether continuous or one shot processing is being used (Step 1025) and if one shot processing is being used processing is stopped (Step 1027). If continuous processing is being used a further time period of data, for example 1 second is loaded into the signal array (Step 1029) for differentiation (Step 1002).

Additionally, the above determinations are made following the setting of data points as a systolic notch and a peak (Step 1021).

It will be appreciated that although described with reference to liveness images being captured in transmission mode as described above, liveness images may also be captured in reflection mode.

While various embodiments of the invention have been described, it will be apparent to those skilled in the art once given this disclosure that various modifications, changes, improvements and variations may be made without departing from the scope of the invention.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A biometric sensor apparatus comprising:
   a plurality of light sources arranged to irradiate an object presented for biometric identification, wherein at least two of said light sources emit light at different wavelengths;
   a circuit configured to pseudo randomly select a light source from said plurality of light sources for irradiating the object;
   an optical image sensor configured to capture radiation that has passed at least part way through the object; and
   a data processor configured to process signals output from the image sensor, the data processor configured to calculate at least one value representative of a parameter indicating a likelihood of whether the object is a body part and further determine a likelihood that the object is a body part.

2. The biometric sensor apparatus as claimed in claim 1 wherein the optical image sensor is arranged in a transmission arrangement, or in a reflectance arrangement.

3. The biometric sensor apparatus as claimed in claim 1 further comprising a CMOS image sensor.

4. The biometric sensor apparatus as claimed in claim 1 wherein the data processor is configured to calculate at least one value representative of a parameter indicative of blood flow through a body member.

5. The biometric sensor apparatus as claimed in claim 1 wherein the data processor is configured to analyze the output of the image sensor for characteristics of spoofing.

6. The biometric sensor apparatus as claimed in claim 1 wherein the data processor is configured to identify any one, or combination, of the following within the output of the image sensor: systolic notch, dicrotic notch, incisura, peak.

7. The biometric sensor apparatus as claimed in claim 1, wherein one of the light sources is a source of infra red radiation.

8. The biometric sensor apparatus as claimed in claim 1 wherein one of the light sources is a visible light source and wherein the data processor is configured to derive an optical pattern associated with the object from the output of the optical sensor in the visible region.

9. The biometric sensor apparatus as claimed in claim 8 wherein the optical pattern is a fingerprint.

10. The biometric sensor apparatus as claimed in claim 1 wherein the optical sensor is arranged to capture said radiation in either a time limited mode, a set number of cardiac cycles mode, or a continuous scanning mode.

11. The biometric sensor apparatus as claimed in claim 1 comprising a platen arranged to receive the object.

12. The biometric sensor apparatus as claimed in claim 1, wherein the image sensor is a CMOS image sensor array.

13. A method for determining whether an object presented to a biometric sensor device is a live body part, comprising:
    illuminating an object presented for biometric identification with a light source selected from a plurality of light sources operable at different wavelengths;
    making the selection of the light source from the plurality of light sources in a pseudo random manner;
    detecting a variation in opacity of said object with respect to time using an image sensor;
    determining at least one value representative of a parameter indicating the likelihood of whether the object is a body part; and
    analyzing variations in the at least one value to determine whether said object is a live body part.

14. The method of claim 13 wherein analyzing comprises analyzing a signal comprising the at least one value to determine critical points.

15. The method of claim 13 comprising determining whether the at least one value is indicative of the characteristics of a heartbeat.

16. A biometric scanning device comprising:
    an apparatus configured to:
       illuminate an object presented for biometric identification with radiation from a plurality of light sources, wherein at least two of said light sources emit light at different wavelengths;
       pseudo randomly select the light source from the plurality of light sources for illuminating the object;
       detect a variation in opacity of said object with respect to time using an image sensor;
       determine at least one value representative of a parameter indicating the likelihood of whether the object is a body part; and
       analyze variations in the at least one value to determine whether said object is a live body part;
    wherein the device comprises any one, or combination, of the following: a fingerprint scanner, a retinal scanner, a palm scanner, a body part scanner adapted to scan any given body part.

17. A biometric sensor apparatus comprising:
    at least one light source configured to irradiate an object presented for biometric identification;
    a sensor configured to sense the irradiation light to detect a variation in opacity of said object with respect to time, wherein the detected variation in opacity is indicative of blood flow within the object; and
    a processor configured to process the sensed variations in opacity to determine existence in the sensed variations of a systolic notch, incisura and dicrotic/diastolic notch relating to blood flow, and further analyze the existence information to determine whether said object is a living body part.

18. The biometric sensor apparatus of claim 17 wherein the sensor further functions as a fingerprint or handprint sensor, the processor further functioning responsive to sensed fingerprint or handprint pattern data to make an identification of the object.

19. The biometric sensor apparatus of claim 17 wherein the at least one light source comprises a plurality of light sources, at least two of the plurality of light sources emitting radiation at different wavelengths, and further comprising a circuit configured to pseudo randomly select a light source from said plurality of light sources for irradiating the object.

20. The biometric sensor apparatus of claim 17 wherein said processor is further configured to process the sensed variations in opacity to determine locations in the sensed variations of the systolic notch, incisura and dicrotic/diastolic notch relative to each other, and further analyze the existence and relative location information to determine whether said object is a living body part.

21. A biometric sensor apparatus comprising:
a plurality of light sources arranged to irradiate an object presented for biometric identification, wherein at least two of said light sources emit light at different wavelengths;
a circuit configured to pseudo randomly select a light source from said plurality of light sources for irradiating the object;
an optical image sensor configured to capture radiation that has passed at least part way through the object and generate signals indicative thereof; and
a data processor configured to process said signals generated by the image sensor to determine a likelihood of whether the object is a live body part.

22. A method for determining whether an object presented to a biometric sensor device is a live body part, comprising:
illuminating an object presented for biometric identification with a light source selected from a plurality of light sources operable at different wavelengths;
making the selection of the light source from the plurality of light sources in a pseudo random manner;
detecting a variation in opacity of said object with respect to time using an image sensor;
processing signals indicative of said variation in opacity to determine a likelihood of whether the object is a live body part.

* * * * *

UNITED STATES PATENT AND TRADEMARK OFFICE
CERTIFICATE OF CORRECTION

| | | |
|---|---|---|
| PATENT NO. | : 8,031,912 B2 | |
| APPLICATION NO. | : 12/114246 | |
| DATED | : October 4, 2011 | |
| INVENTOR(S) | : Carl Dennis et al. | |

It is certified that error appears in the above-identified patent and that said Letters Patent is hereby corrected as shown below:

In the Specification:

At column 3, line number 33, please replace [mm] with -- nm --.

Signed and Sealed this
Fifteenth Day of November, 2011

David J. Kappos
*Director of the United States Patent and Trademark Office*